United States Patent
Lemieux et al.

(10) Patent No.: US 8,063,372 B2
(45) Date of Patent: Nov. 22, 2011

(54) APPARATUS AND METHOD FOR TEMPERATURE MAPPING A ROTATING TURBINE COMPONENT IN A HIGH TEMPERATURE COMBUSTION ENVIRONMENT

(75) Inventors: Dennis H. Lemieux, Casselberry, FL (US); Paul J. Zombo, Cocoa, FL (US); Vinay Jonnalagadda, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 10 days.

(21) Appl. No.: 12/699,936

(22) Filed: Feb. 4, 2010

(65) Prior Publication Data
US 2010/0224772 A1    Sep. 9, 2010

Related U.S. Application Data

(60) Provisional application No. 61/158,088, filed on Mar. 6, 2009.

(51) Int. Cl.
*G01J 5/02* (2006.01)
(52) U.S. Cl. .............................. 250/339.04; 250/339.09
(58) Field of Classification Search .................. 250/330, 250/338.1, 338.3, 338.4, 339.04, 339.09, 250/339.11
See application file for complete search history.

(56) References Cited

U.S. PATENT DOCUMENTS

| | | |
|---|---|---|
| 6,800,854 B2 | 10/2004 | Pfister et al. |
| 6,838,157 B2 | 1/2005 | Subramanian |
| 7,298,818 B2 | 11/2007 | Subramanian et al. |
| 7,376,518 B2 | 5/2008 | Subramanian et al. |
| 7,422,365 B2 | 9/2008 | Chamberlain et al. |
| 7,432,505 B2 | 10/2008 | Brummel |
| 2005/0038817 A1 | 2/2005 | Huang et al. |
| 2006/0232675 A1* | 10/2006 | Chamberlain et al. ........ 348/164 |

FOREIGN PATENT DOCUMENTS
WO    WO 01/46660 A1    6/2001
* cited by examiner

*Primary Examiner* — Mark R Gaworecki

(57) ABSTRACT

Apparatus and method for temperature mapping a rotating component (12) in a high temperature combustion environment. The apparatus includes a thermal imager (14) having a field of view to sense infrared (IR) emissions. Emissivity of a surface of the component is subject to variation in the combustion environment. A radiance emitter (18) defines a spot within the field of view of the thermal imager. The spot indicates a respective emissivity value. A processor (30) is connected to the thermal imager to generate a radiance map of the component based on the IR emissions from the component. The processor includes a thermal calibration module configured to calibrate the radiance map based on the emissivity value of the spot within the field of view of the thermal imager to generate a calibrated thermal map of the component that displays absolute temperature over the surface of the component.

16 Claims, 4 Drawing Sheets

APPARATUS AND METHOD FOR TEMPERATURE MAPPING A ROTATING TURBINE COMPONENT IN A HIGH TEMPERATURE COMBUSTION ENVIRONMENT

CROSS-REFERENCE TO RELATED APPLICATION

This application claims benefit of the 6 Mar. 2009 filing date of U.S. provisional patent application No. 61/158,088, which is incorporated by reference in its entirety herein.

FIELD OF THE INVENTION

The present invention is generally related to thermography, and, more particularly, to a thermal imaging apparatus and techniques for temperature mapping a rotating turbine component in a high temperature combustion environment.

BACKGROUND OF THE INVENTION

It is known to use various superalloy materials, such as cobalt or nickel-based superalloys, for making blades, vanes and other components for power generating turbines, propulsion equipment, etc. These turbines can operate at relatively high temperatures and are generally protected by a series of protective coatings. The coatings may comprise layers of metallic base coats, thermally grown oxide layers, as such layers grow in service-run components and a final ceramic thermal barrier coating ("TBC"). Long-term exposure of these ceramic coatings to the hostile, high temperature, abrasive environment in which such turbines typically operate can cause phase destabilization, sintering, microcracking, delamination and ultimately spallation within the coating layers, exposing the superalloy component and possibly resulting in rapid degradation or failure and potentially requiring costly and burdensome repairs.

U.S. patent application Ser. No. 10/610,214 titled "Method And Apparatus For Measuring On-Line Failure Of Turbine Thermal Barrier Coatings" describes an infrared (IR)-based system configured to non-destructively measure the radiance of a rotating turbine component (e.g., a blade) in a gas turbine in the context of monitoring the formation and progression of TBC defects where images of relative high spatial resolution are needed but where accurate absolute temperature information may not be needed. The foregoing patent application is a Continuation-In-Part of U.S. application Ser. No. 09/470,123, and each is commonly assigned to the assignee of the present invention and herein incorporated by reference in their entirety.

U.S. Pat. No. 7,422,365 describes a thermal imaging system that purportedly uses an in-field-of-view electronically controlled heat source having a known and fixed temperature for generating a calibrated temperature map of a scene. However, such an approach would not be a feasible approach in a high temperature combustion environment of a turbine, where operating temperatures change as a function of the load of the turbine. Moreover, the system described by U.S. Pat. No. 7,422,365 appears to be limited to thermally imaging non-moving objects. Accordingly, such a system would not be suitable for temperature mapping a rotating turbine component.

It would be desirable to acquire two-dimensional IR images of the rotating turbine component to consistently provide accurate absolute temperature measurements of the component. However, temperature measurement errors can be introduced due to various factors, which under prior techniques have not been appropriately accounted for. For example, the emissivity of the TBC can change as a function of wavelength, temperature, age, contamination, etc. Additionally, it would be desirable to account for thermal emissions that may be transmitted through the TBC from subsurface coatings and/or thermal gradients than can arise in a cooled turbine component. Accordingly, it is desirable to provide a system and techniques that overcome the foregoing issues.

BRIEF DESCRIPTION OF THE DRAWINGS

The invention is explained in the following description in view of the drawings that show.

DETAILED DESCRIPTION OF THE INVENTION

In accordance with one or more embodiments of the present invention, structural arrangements and/or techniques conducive to accurate measurements of the absolute temperature of a rotating component, such as a turbine blade, essentially in real-time are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
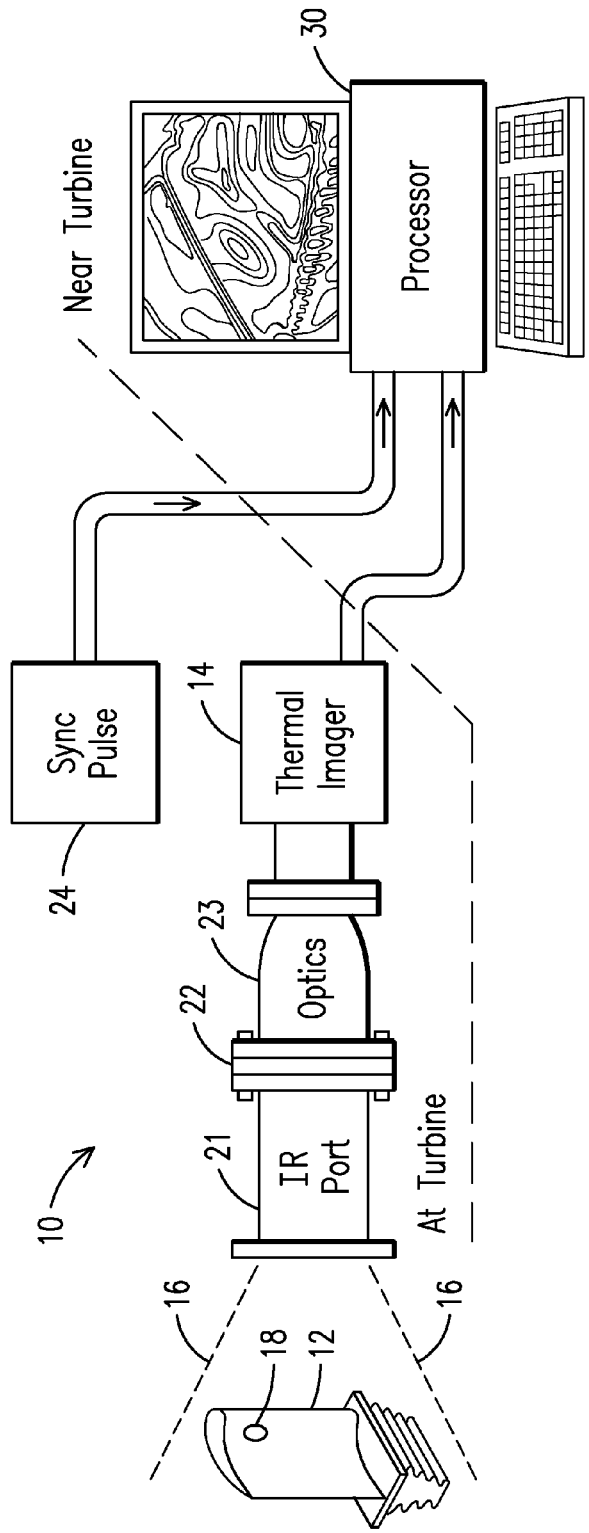
FIG. 1 is a schematic representation of one example embodiment of a thermographic system configured to map a temperature distribution over a surface of a moving turbine component (e.g., a turbine blade) in a turbine under operating conditions.

FIG. 1 is a schematic representation of one example embodiment of a thermographic system 10 configured to map a temperature distribution over a surface of a moving turbine component 12 (e.g., a turbine blade) in a turbine under operating conditions. For example, the blades may be moving at supersonic linear speeds in the order of approximately Mach 1.2 or 890 miles per hour. Example surface temperature for a turbine blade under typical operating conditions may be in the range of approximately 1000 Deg. C. to approximately 1700 Deg. C.

Figure 3:
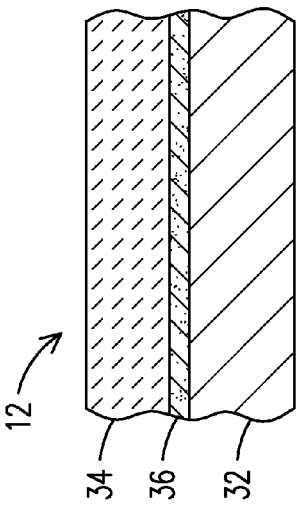
FIG. 3 is a partial cross-sectional view of an example component having a substrate material that may be covered by a thermal barrier coating (TBC) for use in a high temperature environment.

FIG. 3 is a partial cross-sectional view of an example component 12 having a substrate material 32 covered by a barrier coating such as a layer of a thermal barrier coating (TBC) 34 for use in the high temperature environment. As would be readily appreciated by one skilled in the art of TBC coatings, a bond coat 36 such as a MCrAlY material may be deposited on the substrate 32 prior to the application of the TBC material 34 to improve the adherence of the coating 34 to the substrate 32. It will be appreciated that aspects of the present invention are not limited to the example coating arrangement shown in FIG. 3 nor are such aspects limited to components having a TBC coating.

Returning to FIG. 1, a thermal imager 14 senses within a field of view (as may be conceptually defined by lines 16) infrared (IR) emissions from the rotating turbine component. In one example embodiment, thermal imager 14 may comprise a focal plane array sensor (e.g., an array of charged coupled devices (CCD)) to measure the emitted radiance of the component. To obtain the appropriate spatial resolution from a moving blade at Mach 1.2 speeds, the focal plane array sensor should be able to integrate a received IR signal within 3 microseconds or less.

Figure 2:
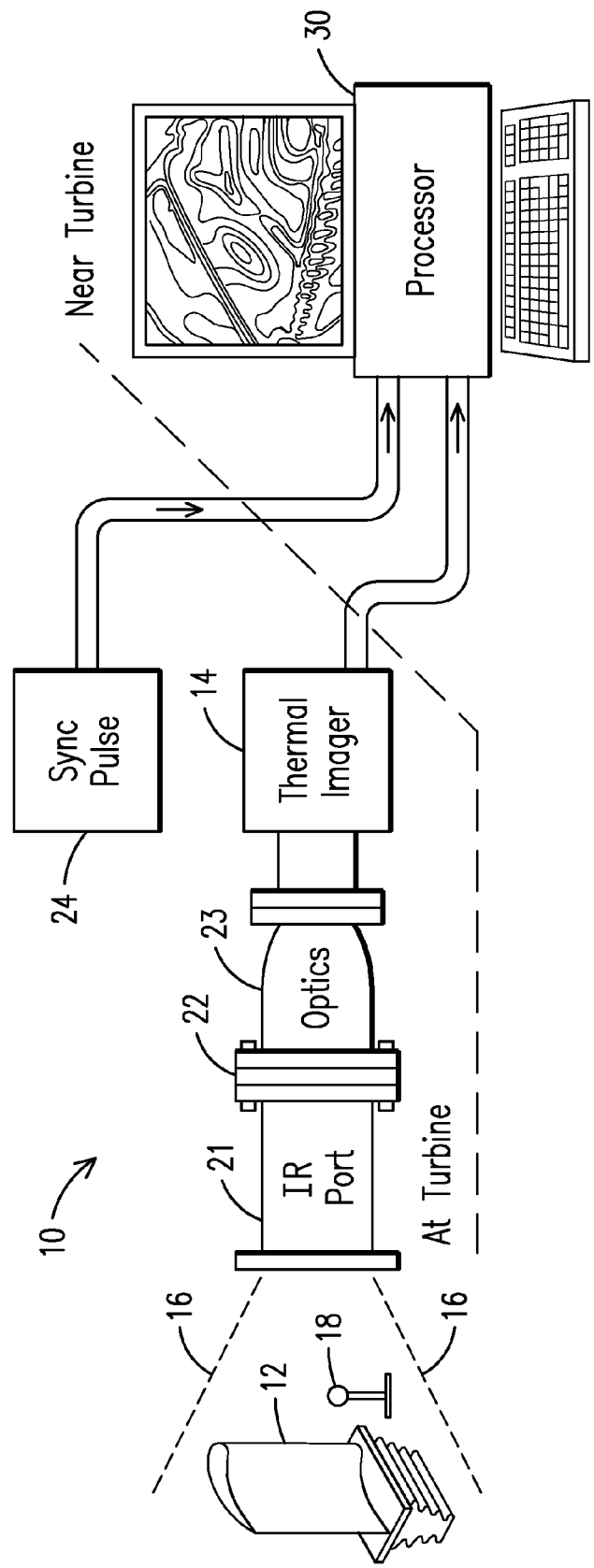
FIG. 2 is a schematic representation of another example embodiment of a thermographic system configured to map temperature distribution in accordance with aspects of the present invention.

In accordance with aspects of the present invention, a radiance emitter 18, e.g., an electrically unpowered (e.g., passive) radiance emitter, is arranged to define at least one spot within the field of view 16 of thermal imager 14. The spot within the field of view 16 of thermal imager 14 is indicative of a respective emissivity value. As shown in FIG. 1, in one example embodiment radiance emitter 18 comprises at least one spot of a predefined material deposited or otherwise disposed on a surface of the TBC. This material should have a sufficiently stable and known emissivity value over the high temperature range of turbine operation. The emissivity value of the material over the temperature range of turbine operation may be experimentally derived using techniques well-understood by those skilled in the art, such as enclosing the material in a test furnace configured to mimic operational conditions of the turbine and obtain appropriate measurements from one or more local thermocouples and the like. An example temperature range may be from approximately 1000 Deg. C. to approximately 1700 Deg. C. The value of the emissivity spot ($\epsilon$) should be relatively high (e.g., $\epsilon \approx 0.7$-$0.9$) Moreover, such a material should be substantially chemically stable and oxidation-resistant in the corrosive combustion environment of the turbine. That is, radiance emitter 18 functions as a stable, unpowered source of IR radiance indicative of emissivity at one or more points within the field of view of the thermal imager 14. Examples of such a material may be chromium oxide, cobalt nickel oxide and platinum. In another example embodiment, as shown in FIG. 2, radiance emitter 18 may comprise at least one thermocouple stationarily disposed within the field of view of the thermal imager. That is, located in a stationary spot within the field of view of the thermal image. In each case, either the stationary thermocouple or the spot of material superimposed on the TBC, radiance emitter 18 provides at least one highly accurate and stable point indication of emissivity within the field of view of the thermal imager 14.

An IR port 21 may be arranged to provide a direct "line of sight" to component 12 and to emitter 18. A pressure barrier 22 may be used to pass the IR emissions from IR port 21 to an optical system 23 for appropriate optical signal conditioning (e.g., focal length selection and appropriate optical magnification) prior to such signals being received by thermal imager 14.

A processor 30 is coupled to thermal imager 14 to generate a radiance map of the component based on the IR emissions from the rotating turbine component. As described in greater detail below, the radiance map is calibrated based on the emissivity value of the spot within the field of view 16 of thermal imager 14 to generate a calibrated thermal map of the component. For synchronization purposes, a revolution-per-minute (RPM) sensor 24 may be used to provide a synchronization pulse to processor 30.

A brief description is given below as to various factors which could affect the relationship between surface temperature and the response of the thermal imager, if such factors were not appropriately accounted for. As will be appreciated by those skilled in the art, radiance refers to radiant power per unit source area per unit solid angle expressed in watts/$m^2$/steradian. Radiance is a superposition of reflectance, transmittance and emittance. In a given body, the emissivity, reflection and transmission coefficients are in accordance with Kirchhoff's law. That is, the sum of such coefficients should be equal to one. An ideal black body is a hypothetical object which is a perfect radiator and does not reflect or transmit any infrared energy incident upon it. All incident energy is absorbed and all such energy is re-radiated by the black body object. An ideal black body would have an emissivity coefficient of one. Real world objects are not perfect radiators and radiance correction is required for accurate temperature measurement.

For example, a newly deployed component with an untarnished TBC coating may have an emissivity coefficient of just about 0.3, which means one is also dealing with reflection and transmission effects. Additionally, this coefficient will substantially change as a function of contamination, aging, etc. As noted above, the coating arrangement may include one or more subsurface coatings and thus the TBC thermal emissions may not totally relate to the TBC's own thermal emissions. For example, in the event that a subsurface bond coating is present, then a fraction of the bond coat's thermal emission would be transmitted through the TBC. As will be further appreciated, the turbine component may be cooled or contacted by a cooling medium supplied by a suitable cooling system, and this will introduce thermal gradients.

In view of the foregoing considerations, it will be appreciated that an off-line temperature calibration curve (function) based on a black-body modeling, as may be obtained from a representative TBC specimen in a temperature-controlled furnace configured to mimic turbine operational conditions may not fully account for such various factors. However, the inventors of the present invention have innovatively recognized that using such a model calibration curve in conjunction with an indication of emissivity from the spot defined by radiance emitter 18 located in the field of view of the thermal imager can provide a more robust calibration. For example, aspects of the present invention are believed to substantially reduce an undue dependency on the off-line calibration and the presumed TBC properties and to more accurately account for the actual TBC properties, and/or operational conditions, such as thermal effects due to one or more subsurface coatings and/or thermal gradients of the component.

Figure 4:
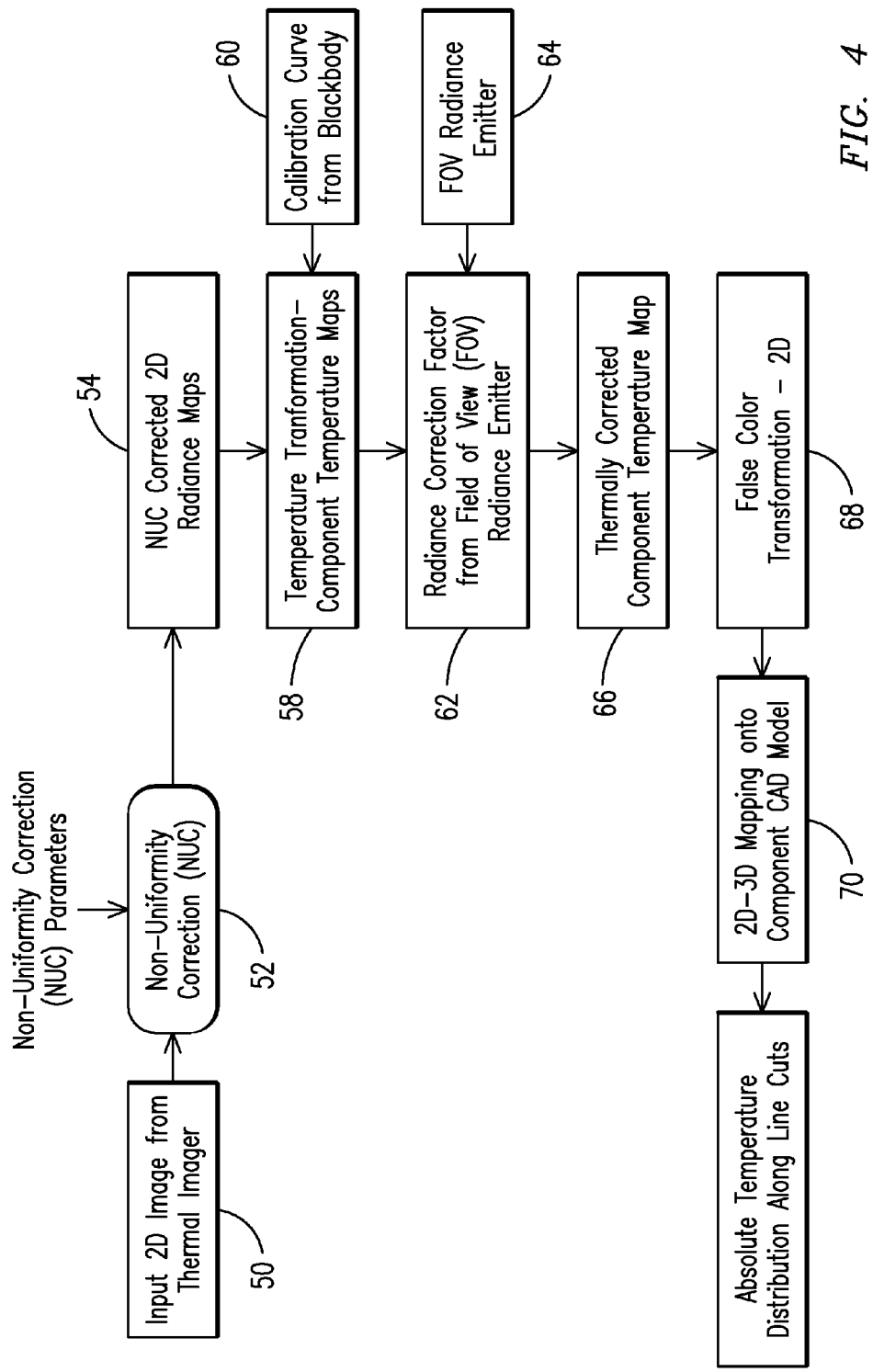
FIG. 4 is an example functional flow diagram of a temperature mapping process as may be performed with a thermographic system embodying aspects of the present invention.

FIG. 4 is an example functional flow diagram of a temperature mapping process as may be performed with a system embodying aspects of the present invention. For example, a processor of the system may be configured for obtaining surface temperature estimation of one or more blades from an operating gas turbine. The relationship between surface temperature and pixel responses values may be obtained as follows: A first example transformation may comprise a non-uniformity correction (NUC) using a standard routine to reduce variation between sensor elements. In one example embodiment, 2D images obtained from thermal imager 14 (block 50) are processed in a non-uniformity (NU) correction module (block 52) to perform a desired NU correction using appropriate parameter sets to generate NU corrected radiance maps (block 54). For example, a given NUC curve may be tailored for specific system settings, such as filter type, sensor parameters including integration time, etc.

A second example transformation (block 58) may comprise determining a temperature transformation for the NU corrected radiance maps. For example, such transformation may be performed using an offline calibration curve (block 60) supplemented with an on-line emissivity spot measurement provided by radiance emitter 18 located in the field of view of the thermal imager (block 64). This supplemental correction (block 62) allows generating a thermally calibrated temperature map that allows mapping the absolute surface temperature of the component (block 66). As shown in block 68, these thermally corrected temperature maps may then be converted to false color isotherms to facilitate human visual perception. As shown in block 70, temperature maps from multiple views of the component may be mapped into a composite 3D component computer-aided design (CAD) model to obtain profile cuts at different regions of the component. As shown in block 72, absolute temperature distribution may be displayed using line cuts (e.g., line contours) configured to connect points of equal temperature.

Figure 5:
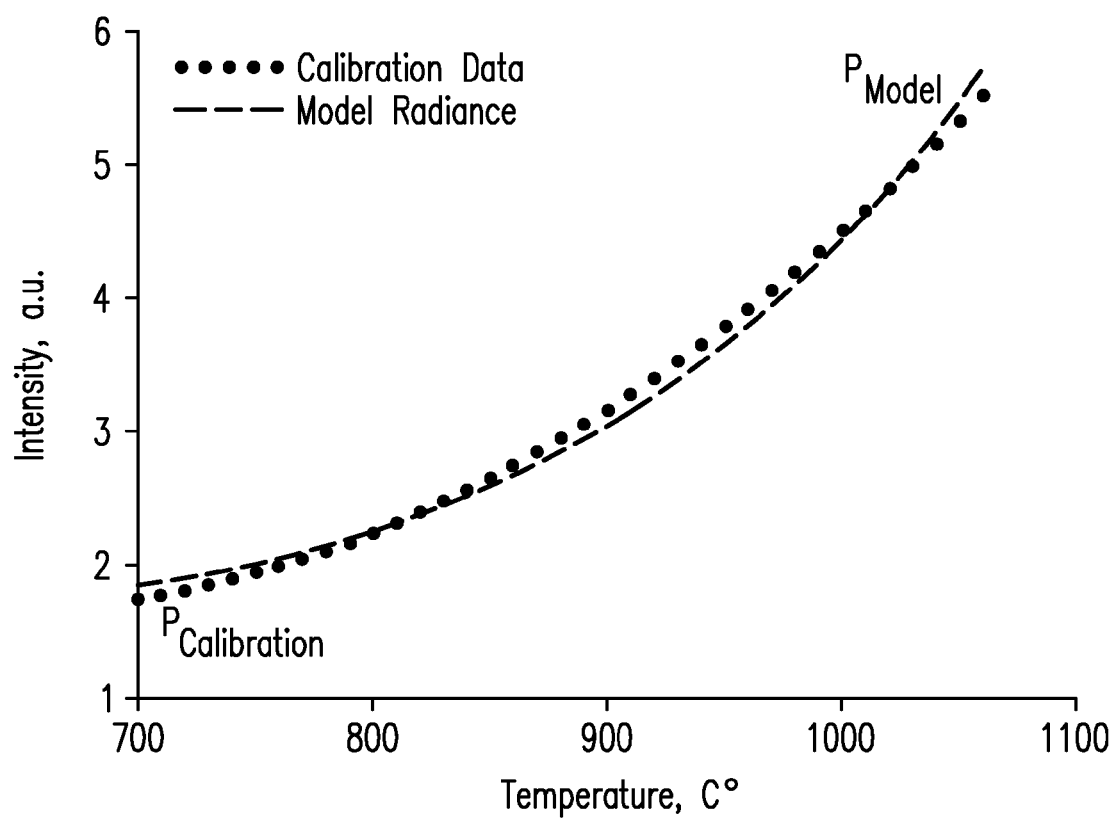
FIG. 5 shows respective plots of a model calibration curve and a calibration curve supplemented with on-line emissivity information obtained from a radiance emitter located in a field-of-view of a thermal imager in accordance with aspect of the present invention.

FIG. 5 shows respective plots of a model calibration curve (dashed line) and a calibration curve (dotted line) supplemented with an on-line emissivity measurement obtained from a radiance emitter located in a field-of-view of a thermal imager in accordance with aspect of the present invention. The respective plots show radiance as a function of temperature.

One experimentally-verified advantageous aspect of the present invention is that an online calibration curve obtained in accordance with aspects of the present invention at one turbine operating condition (e.g., at a first temperature), remains valid under different temperature operating conditions for the turbine.

Aspects of the invention can also be embodied as computer readable code on a computer readable medium. The computer readable medium is any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-system embodying the method of the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for temperature mapping a rotating turbine component in a high temperature combustion environment of a turbine, the apparatus comprising:
    a thermal imager having a field of view configured to sense infrared (IR) emissions from the rotating turbine component, wherein an emissivity of a surface of the component being mapped is subject to variation in the combustion environment of the turbine;
    a radiance emitter arranged to define at least one spot within the field of view of the thermal imager, the spot indicative of a respective emissivity value; and
    a processor connected to the thermal imager to generate a radiance map of the component based on the infrared (IR) emissions from the rotating turbine component, the processor including a thermal calibration module configured to calibrate the radiance map based on the emissivity value of the spot within the field of view of the thermal imager to generate a calibrated thermal map of the component that displays absolute temperature over the surface of the component, wherein the turbine component comprises a thermal barrier coating (TBC) subject to emissivity changes, and further wherein the emissivity value of the spot within the field of view is processed by the processor in conjunction with an emissivity model of the TBC to generate a calibration function to compensate for the emissivity changes of the TBC; and thereby reduce a temperature error effect due to said emissivity changes.

2. The apparatus of claim 1, wherein the turbine component further comprises at least one subsurface coating generating a thermal emission transmitted through the TBC, and further wherein the processor is configured to so that the calibration function is inclusive of the thermal emission transmitted through the TBC, and thereby reduce a temperature error effect due to said thermal emission.

3. The apparatus of claim 1, wherein the turbine component comprises a thermally cooled component subject to thermal gradients, and further wherein the processor is configured so that the calibration function is inclusive of the thermal gradients, and thereby reduce a temperature error effect due to said thermal gradients.

4. The apparatus of claim 1, wherein the turbine component further comprises at least one subsurface coating generating a thermal emission transmitted through the TBC, wherein the turbine component comprises a thermally cooled component subject to thermal gradients, and further wherein the processor is configured so that the calibration function is inclusive of the thermal emission transmitted through the TBC, and/or the thermal gradients and thereby reduce temperature error effects due to the thermal emission transmitted through the TBC, and/or the thermal gradients.

5. The apparatus of claim 1, wherein the radiance emitter comprises at least one thermocouple stationarily disposed within the field of view of the thermal imager.

6. The apparatus of claim 1, wherein the radiance emitter comprises at least one spot of a predefined material disposed on a surface of the TBC, wherein said material comprises a sufficiently stable and known emissivity value.

7. The apparatus of claim 6, wherein the predefined material comprises a chromium oxide material.

8. The apparatus of claim 6, wherein the predefined material comprises a cobalt nickel oxide material.

9. The apparatus of claim 6, wherein the predefined material comprises a platinum material.

10. A method for temperature mapping a rotating turbine component in a high temperature combustion environment of a turbine, the method comprising:
    sensing within a field of view of a thermal imager infrared (IR) emissions from the rotating turbine component, wherein an emissivity of a surface of the component being mapped is subject to variation in the combustion environment of the turbine;
    arranging a radiance emitter to define at least one spot within the field of view of the thermal imager, the spot indicative of an emissivity value; and
    generating a radiance map of the component based on the infrared (IR) emissions from the rotating turbine component; and
    calibrating the radiance map based on the emissivity value of the spot within the field of view of the thermal imager to generate a calibrated thermal map of the component that displays absolute temperature over the surface of the component, wherein the turbine component comprises a thermal barrier coating (TBC) subject to emissivity changes, the method further comprising processing in a processor the emissivity value of the spot within the field of view in conjunction with an emissivity model for the TBC to generate a calibration function to compensate for the emissivity changes of the TBC, and thereby reduce a temperature error effect due to said emissivity changes.

11. The method of claim 10, wherein the turbine component further comprises a at least one subsurface coating generating a thermal emission transmitted through the TBC, wherein the processing is configured so that the calibration function is inclusive of the thermal emission transmitted through the TBC, and thereby reduce a temperature error effect due to the thermal emission.

12. The method of claim 10, wherein the turbine component comprises a thermally cooled component subject to thermal gradients, wherein the processing is configured so that the calibration function is inclusive of said thermal gradients, and thereby reduce a temperature error effect due to said thermal gradients.

13. The method of claim 10, wherein the turbine component further comprises at least one subsurface coating generating a thermal emission transmitted through the TBC, wherein the turbine component comprises a thermally cooled component subject to thermal gradients, wherein the processing is configured so that the calibration function is inclusive of the thermal emission transmitted through the TBC, and/or said thermal gradients and thereby reduce temperature error effects due to the emissivity changes, the thermal emission transmitted through the TBC, and/or the thermal gradients.

14. The method of claim 10, wherein the arranging of the radiance emitter comprises stationarily positioning at least one thermocouple within the field of view of the thermal imager.

15. The method of claim 10, wherein the arranging of the radiance emitter comprises depositing at least one spot of a predefined material on a surface of the TBC, wherein said material comprises a sufficiently stable and known emissivity value.

16. The method of claim 10, wherein the emissivity value of the spot within the field of view is acquired at one turbine operating condition comprising a first temperature, wherein said calibration function can be used at different temperature operating conditions of the turbine.

\* \* \* \* \*